(12) United States Patent
Colegrove et al.

(10) Patent No.: US 6,924,021 B1
(45) Date of Patent: Aug. 2, 2005

(54) COMPLEX-SHAPED CARBON FIBER STRUCTURAL MEMBER AND ITS METHOD OF MANUFACTURE

(75) Inventors: James E. Colegrove, Lake Mills, WI (US); Chad Manuell, West Baraboo, WI (US); Doug A. Cusack, Cottage Grove, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 157 days.

(21) Appl. No.: 10/190,172

(22) Filed: Jul. 3, 2002

(51) Int. Cl.[7] .................................................. B32B 5/12
(52) U.S. Cl. .................. 428/81; 428/192; 428/131; 428/292.1; 428/300.7
(58) Field of Search ..................... 428/81, 192, 131, 428/292.1, 300.7

(56) References Cited

U.S. PATENT DOCUMENTS

| | | | |
|---|---|---|---|
| 4,260,657 A | * 4/1981 | Loyd et al. ................. | 428/113 |
| 5,215,322 A | 6/1993 | Enders ........................ | 280/231 |
| 5,271,879 A | 12/1993 | Saatchi et al. ............. | 264/46.5 |
| 5,624,519 A | 4/1997 | Nelson et al. .............. | 156/245 |
| 5,685,553 A | 11/1997 | Wilcox et al. ............. | 280/283 |
| 6,109,638 A | 8/2000 | Colegrove ............... | 280/288.3 |
| 6,270,104 B1 | 8/2001 | Nelson et al. ........... | 280/281.1 |
| 6,277,463 B1 | * 8/2001 | Hamilton et al. ........... | 428/106 |

OTHER PUBLICATIONS

Fudge, Jack, Hexcel Research and Technology, "HexMC™—Composites In 3D (A New High Performance Molding Compound," 2000.
"HexMC™ Moulding Compound" Product Data, 2000.
Hexcel Composite Materials "What is HexMC?" data sheets.

* cited by examiner

*Primary Examiner*—Elizabeth M. Cole
(74) *Attorney, Agent, or Firm*—Boyle Fredrickson Newholm Stein & Gratz S.C.; James F. Boyle

(57) ABSTRACT

A complex-shaped carbon fiber structural member including a multiplicity of carbon epoxy fiber bundles surrounded by a unidirectional carbon fiber rope and its method of manufacture are provided. The fiber bundles are formed from large sheets of unidirectional carbon fiber materials cut into small strips, with the strips then being randomly oriented in the form of a sheet of randomized fiber bundles. The strips, and the fibers in the strips, cross over one another so as to form a layer of material that has a relatively uniform strength in all directions. The sheets of randomized carbon epoxy fiber bundles are cut into preforms for the structural part being made. Several preforms are stacked on top of each other in order to provide material to make the part of a desired thickness. To reinforce the bundles within the part, particularly along its outer periphery, the preforms are wrapped prior to molding with an elongated rope of unidirectional carbon fibers. The preforms and unidirectional rope are assembled together in an appropriate mold, which is then subject to heat and pressure for molding and curving the part.

9 Claims, 7 Drawing Sheets

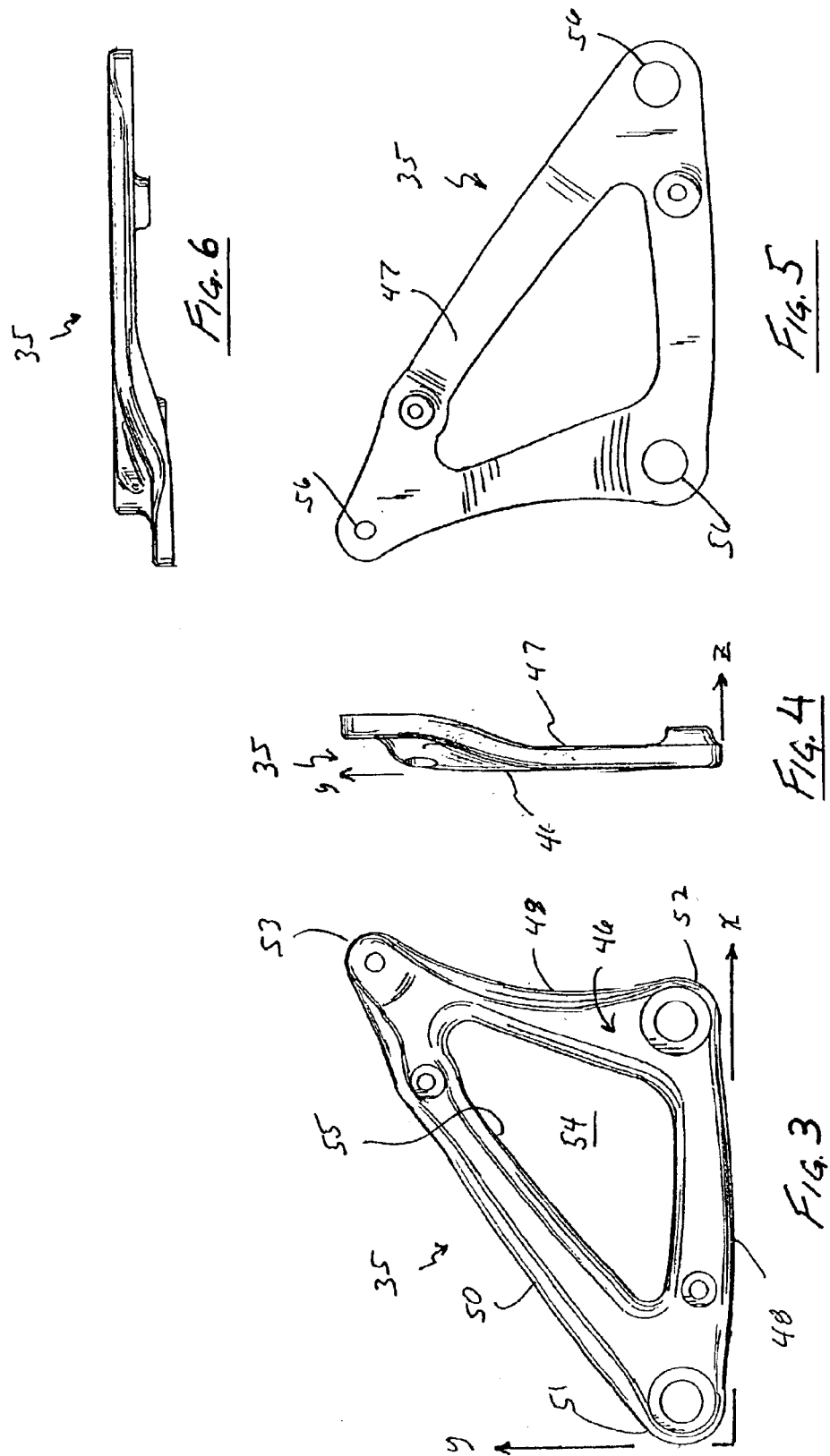

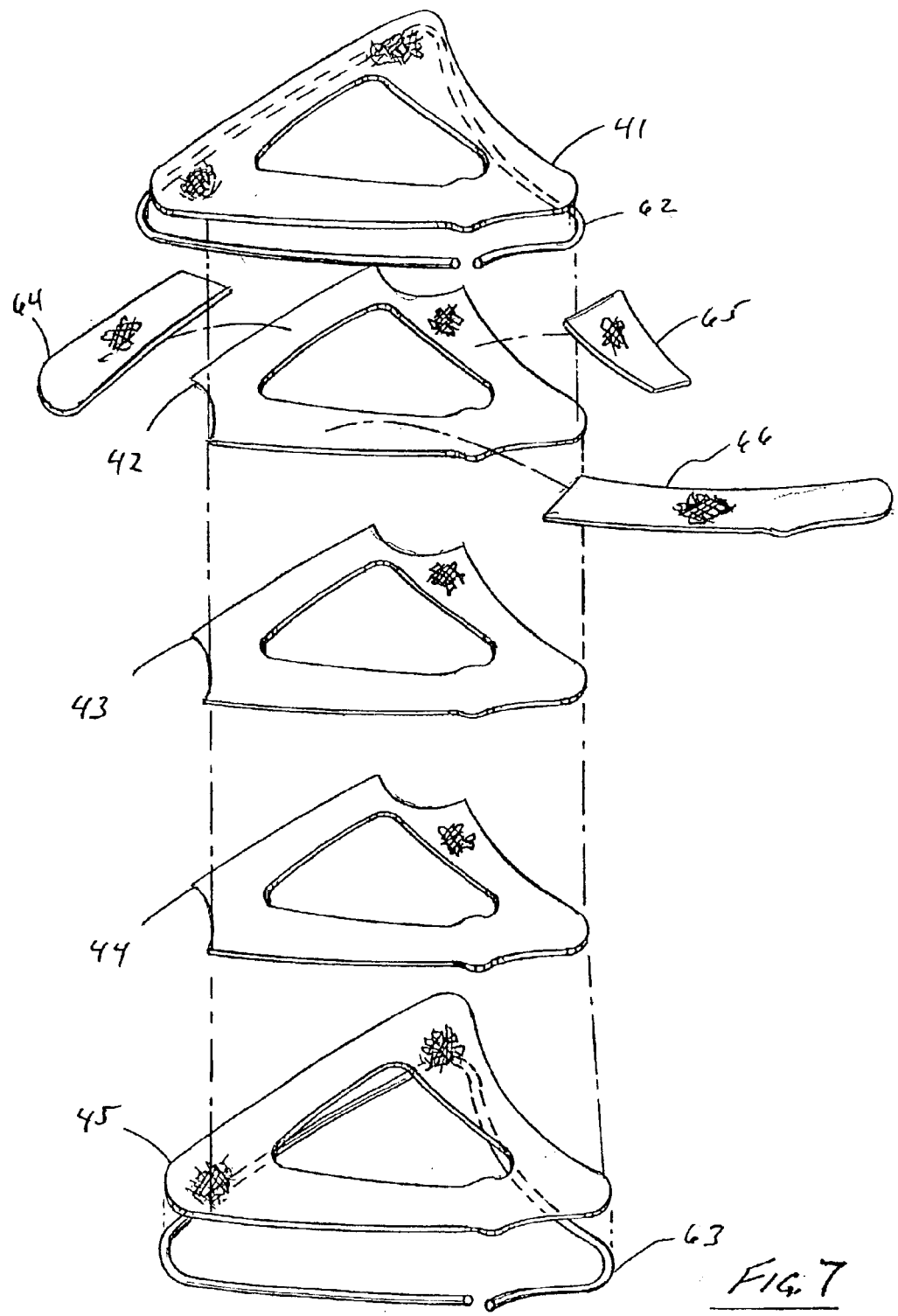

COMPLEX-SHAPED CARBON FIBER STRUCTURAL MEMBER AND ITS METHOD OF MANUFACTURE

BACKGROUND OF THE INVENTION

1. Field of the Invention

The present invention relates to complex-shaped carbon fiber structural parts and components, such as those used on bicycles and bicycle suspension systems, and their method of manufacture. In particular, the invention relates to three-dimensional parts and structural components made of composite carbon epoxy fiber bundles surrounded by a unidirectional carbon fiber rope.

2. Discussion of the Related Art

Composite fiber materials have been utilized in place of metal for constructing structural frames and frame members in a number of applications. Composite fiber materials generally have a lower density, higher specific strength and stiffness, and better dampening qualities than metals. Composite fiber materials therefore normally provide an increase in strength and stiffness with a reduction in weight, as compared to similar structural members made of steel and aluminum alloys and other metals. Because of the natural desire to reduce the weight of bicycles, composite fiber materials have been specifically used in the manufacture of bicycle frames.

One highly successful line of composite fiber bicycle frames is the Optimum Compaction Low Void (OCLV) series manufactured by the Trek Bicycle Corporation. The frame for a Trek OCLV 5500 bicycle, for example, is formed by joining a set of composite fiber tubes to a set of composite fiber lugs. The tubes are those portions of the frame that form the top tube, down lube, seat tube, chain stays and seat stays. The lugs are the irregularly shaped portions of the frame that form the head lug, seat lug and bottom bracket lug. The lugs are preformed and pre-cured articles fabricated from a composite fiber material comprised of overlaid layers of unidirectional carbon fibers embedded in an epoxy resin. Several layers of material are stacked on top of each other so that the fibers of adjacent layers cross over one another. The stacks of unidirectional fibers are cut into shapes called preforms for molding into a particular lug. The preforms are placed in a mold and arranged around an inflatable bladder. The assembly of preforms is then heated and cured, with the bladder pressurized for urging the respective preforms into the shape of the mold. This method of fabrication provides a high laminate compaction having low voids, which results in a strong, uniform, thin walled, tubular lug. The composite fiber tubes may be formed by a similar method. The separate tubes and lugs are then glued together to construct the frame. Further details of this method of making an all-composite bicycle frame are disclosed in U.S. Pat. Nos. 5,624,519 and 6,270,104 assigned to the Trek Bicycle Corporation.

The above-described method for making composite lugs has also been used to make larger frame members, sometimes called large lugs, such as the Y-shaped frame shown in U.S. Pat. Nos. 5,685,553 and 6,109,638 also assigned to the Trek Bicycle Corporation. The Y-shaped frame is identified as reference numeral 12 in FIG. 1 of the '553 patent, and identified with reference numeral 20 in FIG. 1 of the '638 patent.

The carbon fiber structures and the methods of manufacture discussed above relate, as mentioned, to the bicycle frame, which is the largest and typically heaviest portion of a bicycle. However, there are a number of other components to a bicycle which are commonly made of metal. It is desirable to also make those other components as light in weight as possible. One method to make parts using carbon fibers has been to use a material known as a short fiber composite material consisting of random chopped fibers. The material, referred to in the composite industry as sheet molding compound, comes in a roll of sheet material of the randomly chopped fibers. The chopped fiber material is placed into a mold under heat and compression, and formed in a manner much like an injection molding process. Upon heating, the short fibers which are embedded in an epoxy resin essentially flow to take on the form of the mold. Unfortunately, structural components made solely of short fiber composite materials have not exhibited sufficient strength and durability, particularly in the rugged environments found in bicycle racing and mountain bicycling. Such parts have been prone to failure and cracking.

Of course, in the field of bicycles, and especially in the field of bicycle racing, there is a never-ending desire to build ever-lighter bicycles and bicycle components.

SUMMARY OF THE INVENTION

A complex-shaped carbon fiber structural member and its method of manufacture are disclosed. The invention disclosed herein relates to structural parts and components of the type commonly subjected to external forces. Structural parts and components for bicycles and bicycle suspension systems are typical examples. The invention relates in particular to a structural member having an irregular shape, having dimensions that extend in x, y and z directions, and is used for connecting two or more other structural members together. The nature of the connection between multiple structural members is also done in a manner that allows movement or pivoting relative to each member.

The invention of a complex-shaped composite carbon fiber structural member as disclosed herein is generally comprised of a multiplicity of carbon epoxy fiber bundles surrounded by a unidirectional carbon fiber rope. The fiber bundles are formed from large sheets of unidirectional carbon fiber materials which have been cut into small strips, and the strips are then laid down randomly to form a sheet of randomized bundles. The strips, and the fibers in the strips, cross over one another so as to form a layer of material that has a relatively uniform strength in all directions.

The sheets of randomized carbon epoxy fiber bundles are cut into preforms for the structural part being made. Several preforms are stacked on top of each other in order to provide material to make the part of a desired thickness. To reinforce the bundles within the part, particularly along the outer periphery, the preforms are wrapped prior to molding with an elongated "rope" of unidirectional fibers. The "rope" is comprised of an elongated strip of unidirectional fibers, also embedded in an epoxy resin, which is rolled lengthwise to form a narrow rope which is then wrapped around the part being made. The unidirectional fiber rope is long enough to wrap entirely around the outer perimeter of the part.

The preforms and unidirectional rope are assembled together in an appropriate mold, which is then subject to heat and pressure for molding and curving the part. The part may be subject to additional processing, such as trimming and machining. The resulting structural member is extremely lightweight yet very rigid.

The primary objects of the invention are therefore to provide a composite fiber structural member having a complex shape that is sufficiently strong yet lighter in weight than similar parts made of metal and aluminum alloys and other metal materials; to provide a composite fiber structural member, and a process for its manufacture; to provide a structural part that is comprised of carbon epoxy fiber bundles surrounded by a unidirectional carbon fiber rope; and to provide a carbon fiber structural part, particularly one for use on bicycles and bicycle suspension systems, which is stronger and more durable than previously known composite fiber structural parts.

Other objects and advantages of the invention will become apparent from the following description which sets forth, by way of illustration and example, certain preferred embodiments of the invention.

BRIEF DESCRIPTION OF THE DRAWINGS

The drawings, which constitute a part of the specification and include exemplary embodiments of the present invention, include the following:

FIG. 3 is a side view of the composite fiber structural member of the present invention.

FIG. 4 is a front view of the member.

FIG. 5 is a rear view of the member.

FIG. 6 is a top view of the member.

FIG. 7 is an exploded view illustrating the assembly of preforms to manufacture the composite fiber structural member of the present invention.

DETAILED DESCRIPTION OF THE PREFERRED EMBODIMENTS

The following is a detailed description of a composite fiber structural member and its method of manufacture. For purposes of describing the invention, reference will be made to a structural member for a bicycle suspension system, but it is to be understood that the invention disclosed herein is not intended to be limited to bicycles, bicycle suspension systems or to bicycle parts. The invention may be also used to construct a variety of other structural members where the combination of high strength and lightweight provided by the present invention is desired.

The bicycle frame described below is for a traditional two-wheeled bicycle. In general, a bicycle frame performs several primary functions, including: providing a support for the bicycle wheels; providing a support for a mechanism for steering the bicycle; providing a support for a pedal mechanism that provides a mode of power for propelling the bicycle; providing a support for a seat; and providing a support for a braking mechanism.

Figure 1:
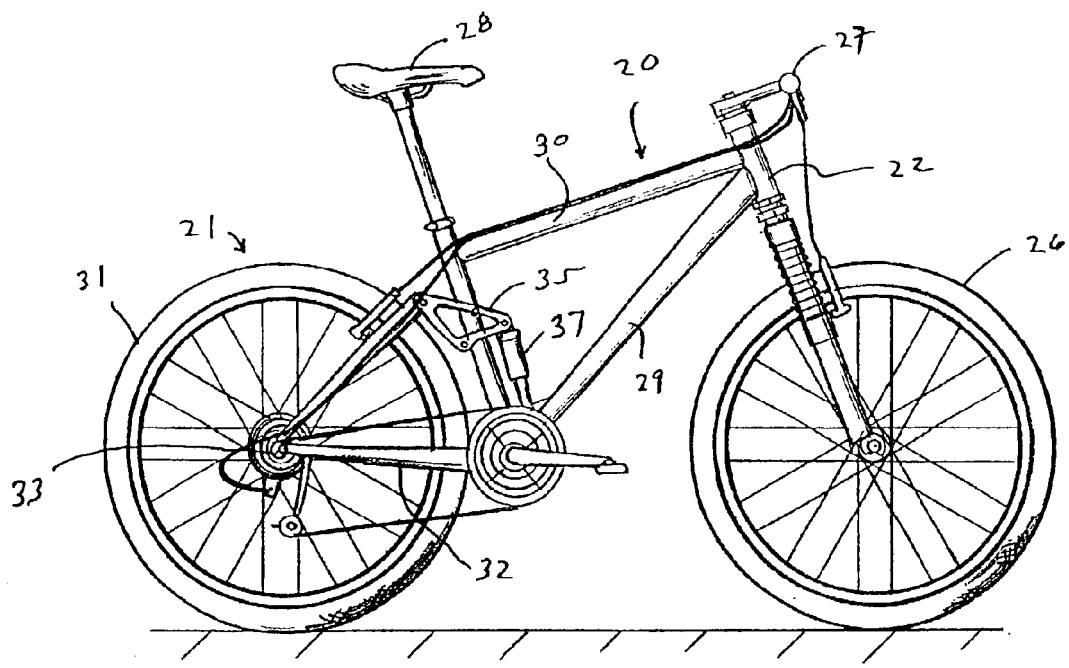
FIG. 1 is a side elevation view of a bicycle that includes a complex-shaped composite fiber structural member of the present invention.
Figure 2:
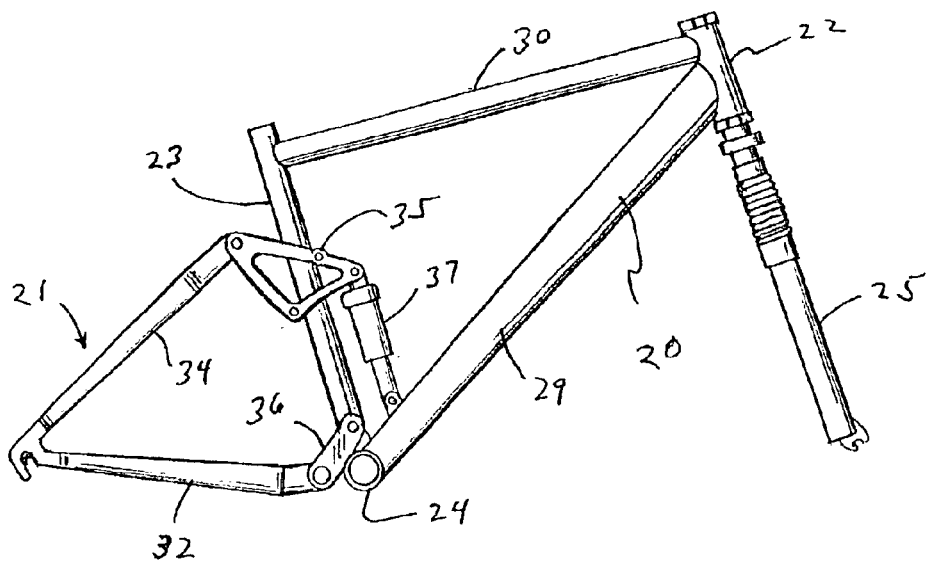
FIG. 2 is a side elevation view of the frame and suspension system for the bicycle illustrated in FIG. 1.

The bicycle frame shown in FIGS. 1 and 2 in the present application is essentially comprised of a main front triangular frame member 20 and a rear suspension 21. More specifically, the front frame 20 includes a head tube 22 at the upper forward portion of the frame, a seat tube 23 at the rearward portion of the frame, and a bottom bracket 24 at the lower portion of the frame. The head tube 22 of course supports the steering fork 25, on which the front wheel 26 is attached, and supports the handlebar 27 for steering the bicycle. The seat tube 23 is used for adjustably supporting a seat, sometimes referred to as a saddle 28. The bottom bracket 24 supports the pedals and chain drive mechanism for powering the bicycle. The head tube 22 and bottom bracket 24 are rigidly supported relative to each other via the down tube 29 which extends from the head tube downwardly and rearwardly to the bottom bracket. The seat tube 23 is supported by the top tube 30 which extends generally rearwardly from the head tube 22 to the seat tube 23. The seat tube 23 extends from the upper central portion of the bicycle where the seat 28 is attached downwardly to the bottom bracket 24.

The bibycle illustrated in FIGS. 1 and 2 further includes a rear suspension system 21 for the rear wheel 31. The rear suspension system 21 is comprised of a chain stay 32 that extends generally from the area of the bottom bracket 24 rearwardly towards the rear axel 33, and a seat stay 34 that extends generally from the upper portion of the seat tube 23 downwardly and rearwardly toward the rear axel 33. A triangulated rocker link 35 is used for pivotally attaching the upper, forward end of the seat stay 34 to the upper portion of the main frame 20. A second link 36 pivotally connects the forward portion of the chain stay to the lower portion of the main frame.

For purposes of discussing an example of a composite fiber structural member of the present invention, reference will be made to the triangulated rocker link 35. As can be seen, the triangulated rocker link 35 is used for connecting the rear suspension system 21 to the main frame 20 and to a shock absorber 37 for dampening shocks during a bicycle ride, which necessarily means that it must have a relatively high degree of strength and be capable of transferring significant loads and absorbing impacts.

Figure 14:
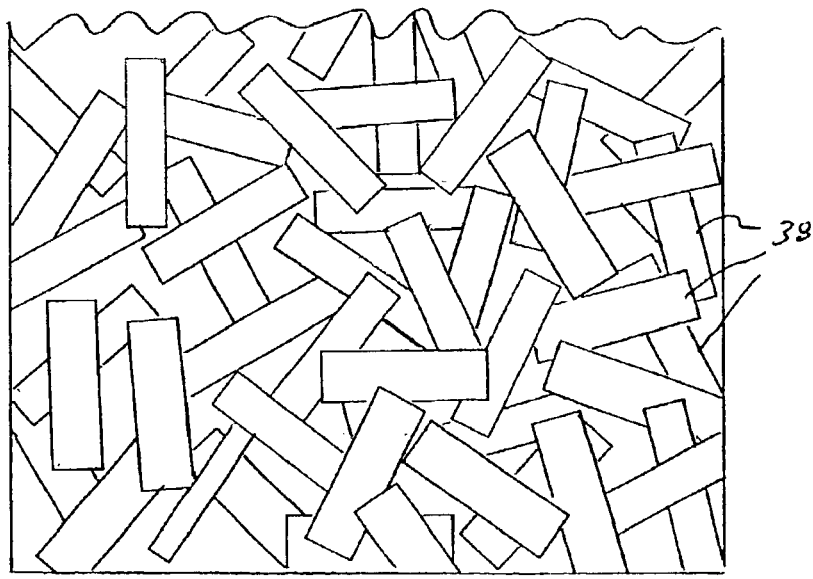
FIG. 14 is an illustration of a sheet of randomized carbon fiber bundles.
Figure 15:
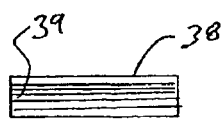
FIG. 15 is an illustration of a single carbon fiber bundle.

The composite fiber structural member, which in this case is the triangulated rocker link 35, is a non-metallic part, made entirely of composite carbon fibers embedded in an epoxy resin. More specifically, the composite material is comprised of a multiplicity of randomized carbon epoxy fiber bundles surrounded by a unidirectional carbon fiber rope. The fiber bundles are formed by first forming a layer of a multiplicity of unidirectional carbon fibers embedded in an epoxy resin. The fibers are preferably of an aerospace grade of carbon fibers. The material is typically produced in sheet form, which is available from a number of sources. The carbon fiber sheets are cut into strips (e.g., about 50 mm by 8 mm) to form what is referred to as a carbon epoxy fiber bundle. The fiber bundles are then randomly oriented and moderately heated to lightly bond the bundles together. The randomized bundles are also laid down to form a sheet or carpet of material. FIG. 15 illustrates a single carbon fiber bundle 38. The parallel lines are intended to illustrate the unidirectional carbon fibers 39 within the bundles. FIG. 14 illustrates a multiplicity of carbon fiber bundles 38 that have been randomly oriented into the form of a sheet 40. One suitable form of randomized carbon epoxy fiber bundles provided on a roll in sheet form is known as HexMC™, which is available from Hexcel Corporation, Dublin, Calif.

Referring to FIG. 7, the sheet form of randomized carbon fiber bundles is cut into several performs 41, 42, 43, 44 and 45. A preform is a layer of unmolded carbon fiber material that is cut into a shape that substantially conforms to the part intended to be molded. Preferably, several preforms are used in molding the part, the number of preforms depending upon the ultimate thickness of the part being molded.

The process for cutting, forming and assembling performs for the present invention is similar to the process disclosed in applicant's U.S. Pat. Nos. 5,624,519 and 6,109,638, which are fully incorporated herein by reference. The principal difference is that, in the '519 and '638 patents, the layers of composite material are made of unidirectional carbon fibers, so it is necessary to orient each layer so that the fibers in the various layers cross over each other. As mentioned, the present invention contemplates use of a carbon fiber material, which prior to cutting and formation into a preform, is comprised of randomized carbon fiber bundles. Therefore, it is not necessary to deliberately orient the layers or preforms in any particular direction. Secondly, because in the '519 and '638 patents it is also necessary to orient the fibers in each layer in a particular direction, it is necessary to assemble the layers together prior to cutting them into preforms. For the present invention, because the fiber bundles in each layer are already randomly oriented, it is possible to cut the layers into preforms either before or after they have been layered. That is, a sheet of randomized fiber bundles may be first cut into several preforms, and then followed by the step of stacking the preforms on top of each other to form the part. Alternatively, it may be possible to first stack several sheets of randomized fiber bundles on to each other, and then cut the assembled layers into preforms.

As mentioned, the structural member, in this case the triangulated rocker link 35, is used to pivotally connect the rear suspension system 21 to the main frame 20 of the bicycle. Referring to FIGS. 1–6, the part in this case is a three-dimensional part. The part has generally two sides, a first side 46 and second side 47, though neither side is perfectly flat. The triangulated rocker link 35 in particular has substantially three edges forming the outer perimeter of the part, a first edge 48, a second edge 49 and a third edge 50, with the edges terminating at a first rounded corner 51, a second rounded corner 52, and a third rounded corner 53. For the triangulated rocker link in particular, it further has a hole 54 in the middle forming an inner perimeter 55 which likewise is generally triangular in shape in that it has three inner edges and three inner corners. As mentioned, the part illustrated in FIGS. 3–6 is a three-dimensional part, which necessarily means that portions of the part extend in an x direction, a y direction and a z direction. As mentioned, the two side faces of the part 46 and 47 are not flat, so each side face likewise extends in an x direction, a y direction, and a z direction. Because the triangulated rocker link 35 is used to pivotally connect several parts of the bicycle together, it further includes pinholes for fasteners for connecting the frame members together.

Figure 8:
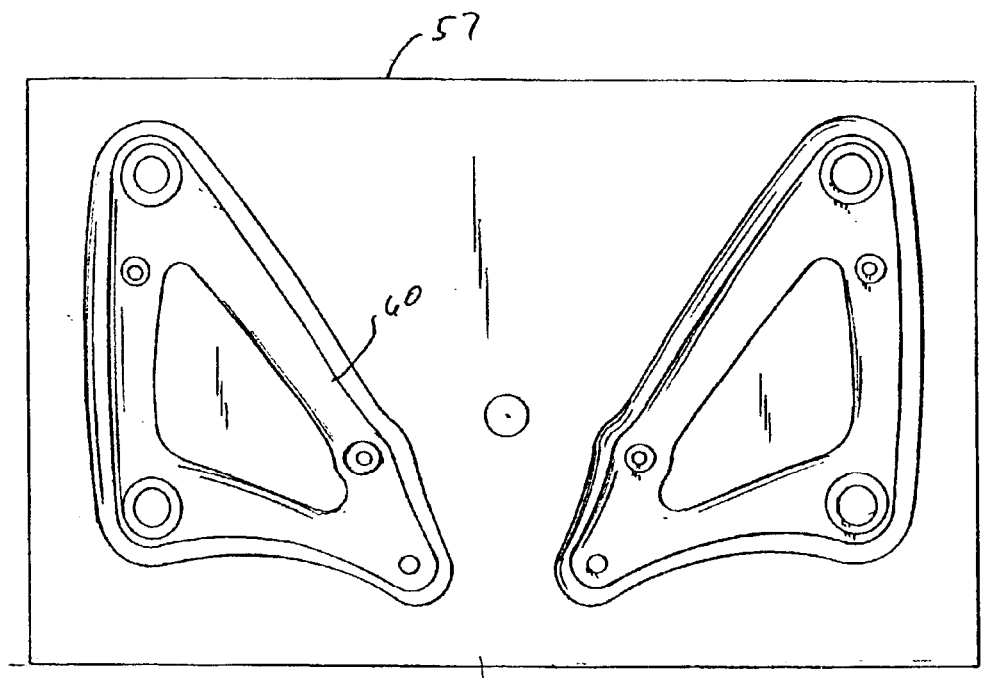
FIG. 8 is a plan view of one half of a mold used in the manufacture of the composite fiber structural part of the present invention.
Figure 9:
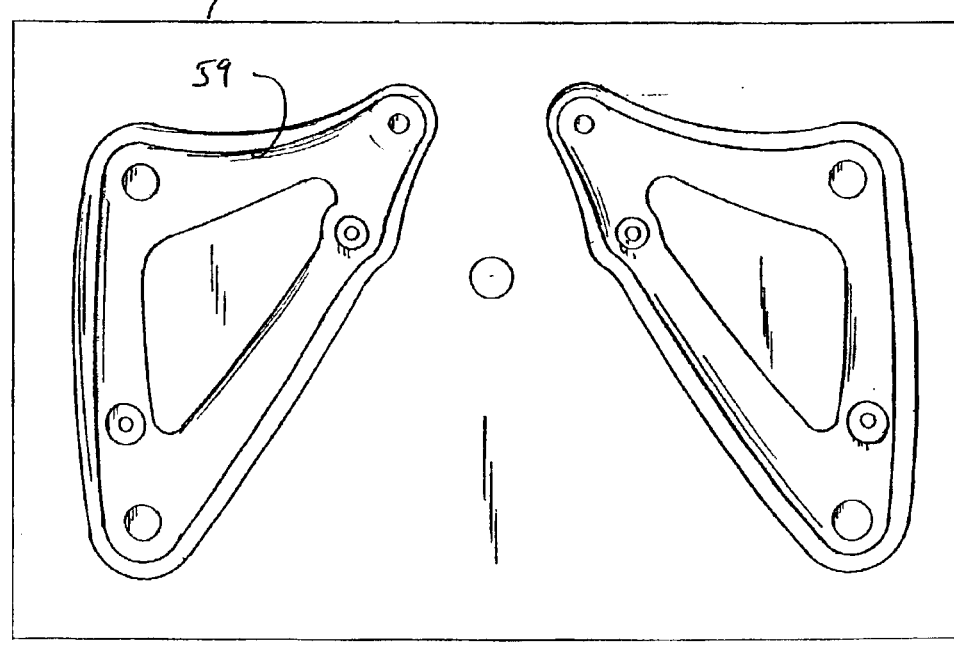
FIG. 9 is a plan view of the second half of the mold used in the manufacture of the composite fiber structural part of the present invention.

Referring to FIGS. 8–11, the part is formed in a mold. FIG. 8 illustrates the top half 57 of the mold. FIG. 9 illustrates the bottom half 58 of the mold. The performs 41–45 are placed within a cavity 59 in the bottom half 58 of the mold, and then heated and compressed by the corresponding male portion 60 in the top half 57 of the mold. The triangulated rocker link 35 in particular is a component that is required on both sides of a bicycle. Accordingly, the bicycle illustrated in FIGS. 1 and 2 has two triangulated rocker links, a left side link and a right side link. For this reason, FIGS. 8 and 9 show two molding cavities for the right and left rocker links, respectively. The two cavities are mirror images of each other, but otherwise are identical in all respects.

Figure 10:
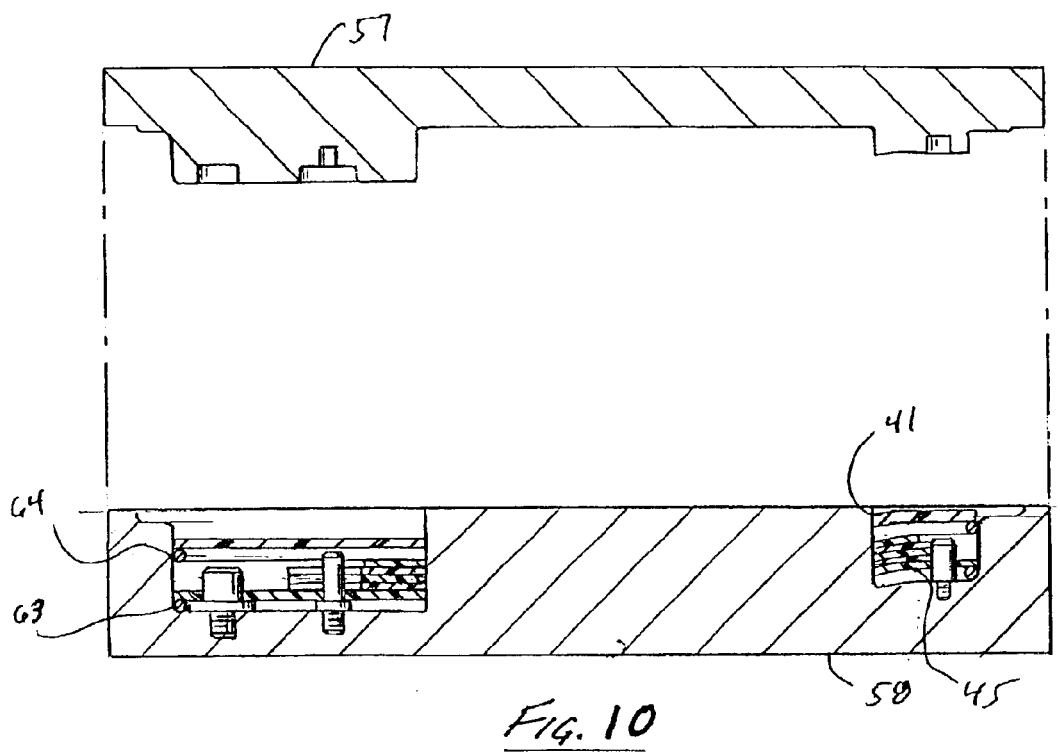
FIG. 10 is cross-section of the preforms illustrated in FIG. 7 and the molds illustrated in FIGS. 8 and 9, with FIG. 10 illustrating the assembly of the preforms into the mold prior to molding and curing of the part.
Figure 11:
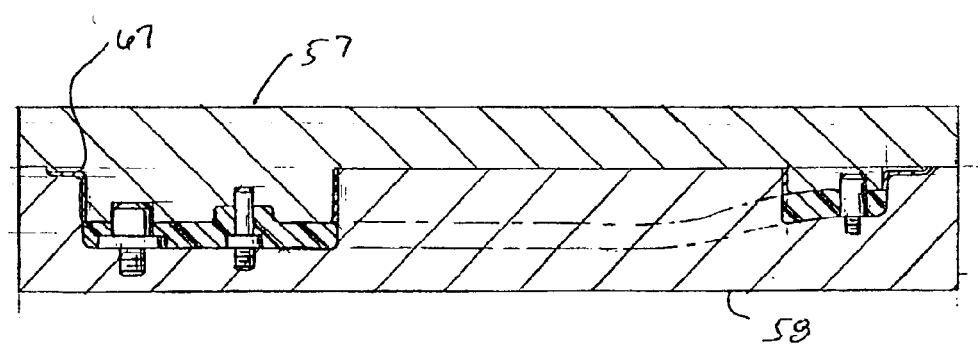
FIG. 11 is a cross-section view of the mold and part during the molding process.

Referring to FIGS. 7, 10 and 11, the preforms for the part are assembled in the following manner. As mentioned, a number of performs 41–45 having a shape corresponding generally to the shape of the part to be molded are cut from a sheet form of randomized carbon epoxy fiber bundles in the manner described above. The performs 41–45 are placed within the mold cavity 59 so that one perform is laid on top of the other. FIG. 7 illustrates the use of five preforms to build up the material needed for the triangulated rocker link 35 discussed here. Of course, the specific number of preforms depends upon the thickness of the specific part being made.

Figure 16:
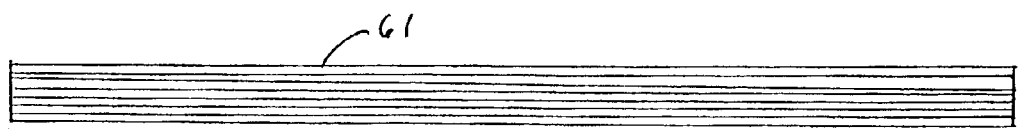
FIG. 16 is an illustration of an elongated strip of unidirectional fibers.
Figure 17:
FIG. 17 is an illustration of an elongated strip of unidirectional fibers rolled lengthwise in order to form an elongated unidirectional fiber rope.

The assembly of materials further includes at least one unidirectional carbon fiber rope that extends around the outer perimeter of the part. A unidirectional carbon fiber rope is comprised of an elongated strip 61 of parallel, continuous unidirectional carbon fibers as illustrated in FIG. 16. The parallel lines in FIG. 16 is likewise intended to illustrate the long, parallel fibers. The strip 61 is preferably rolled lengthwise to form a narrow rope 62. The strip, or rope, is of a length sufficient to wrap around the entire outer perimeter of the part being molded. Preferably, the two ends of the rope 62 overlap each other when put in place in the mold. FIGS. 7 and 10 illustrate two carbon fiber ropes 62 and 63 placed around the preforms. The first carbon fiber rope 62 is placed on the bottom of the cavity of the mold in FIG. 10, and the second rope 63 is placed in close proximity to the last, or top preform that is placed in the mold. When molded, the carbon fiber ropes will extend in the vicinity of the outer corner edge of the part. Additional carbon fiber ropes may be placed around the part as desired, depending upon the particular part being made, its thickness, performance requirements, and so forth.

The triangulated rocker link 35 discussed above and illustrated in the drawings has a hole 54 with an inner perimeter 55 in the center. One or more carbon fiber ropes may be optionally placed around the inner perimeter of the hole in the part, as well.

FIG. 7 also illustrates additional center strips 64, 65 and 66 placed in between the preforms of the part. The center strips serve the purpose of providing additional fiber material in places where additional material is required. The center strips also serve the purpose of controlling the amount of fiber, and thus weight, of the end product. Composite carbon fiber parts are preferably made using a certain specified amount of fiber material. Because the specific density of randomized carbon epoxy fiber bundles varies slightly, the weight of the preforms alone may or may not fit within the specified range of weights for the part to be molded. If additional fiber material is required, additional center strips may be added to reach the desired weight. Alternatively, the center strips may be reduced in size or eliminated altogether in order to reach the desired weight content. The number of preforms used to make the part may be increased or decreased in a like manner in order to provide the desired weight of raw material.

Upon assembly of the preforms and unidirectional ropes into the molding cavity, as illustrated in FIG. 10, the top half 57 of the mold is closed onto the part as illustrated in FIG. 11. An appropriate amount of heat and pressure is applied to bond and cure the constituent layers of material together.

Because the carbon fibers are embedded in an epoxy resin, the epoxy resin tends to become squeezed or leech out of the mold during the heating and pressurizing step. Referring to FIG. 11, the epoxy resin tends to flow and creep upwardly between the gaps between the two mold halves. Allowing the epoxy to leech out results in a higher density of carbon fibers remaining in the part, which is desirable.

Figure 13:
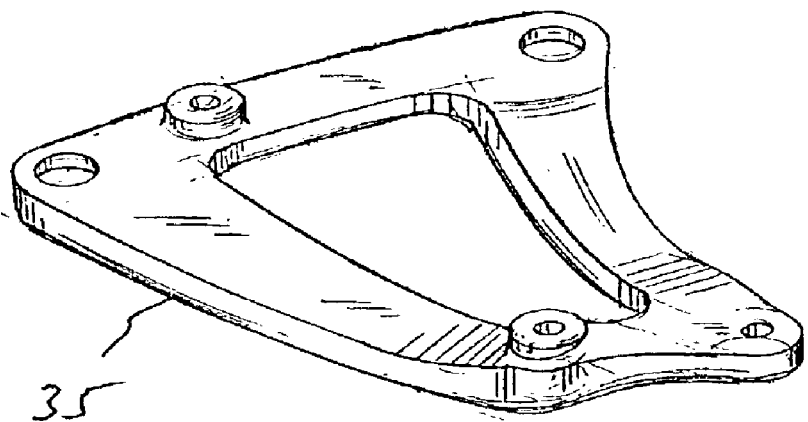
FIG. 13 is a perspective view of the composite fiber part of the present invention after the epoxy residue has been trimmed and the part has been machined.
Figure 12:
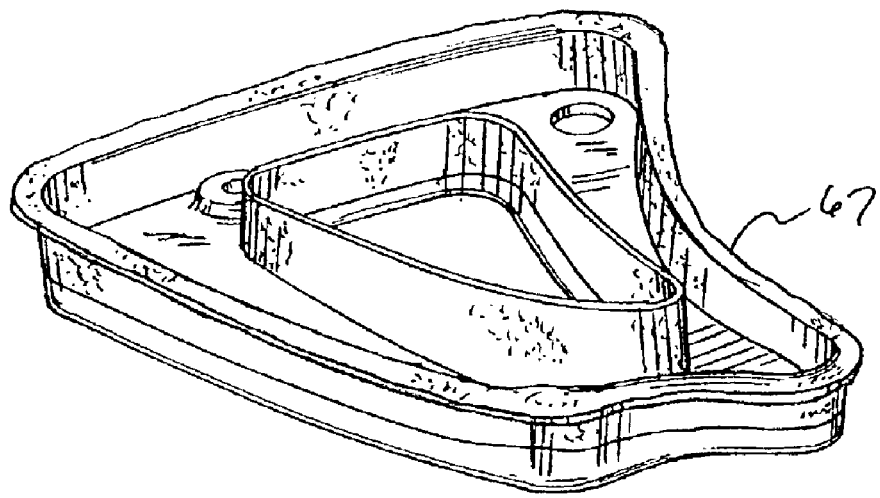
FIG. 12 is a perspective view of the part subsequent of molding but prior to trimming and machining.

Upon the completion of the heating, pressurizing and curing step, the part is removed. FIG. 12 illustrates the part as it appears following removal from the mold. As can be seen, the epoxy resin forms an edge 67, which is later trimmed during the machining process. The part may then be trimmed and machined as required for its ultimate use, as it appears in FIG. 13.

The resulting product is an exceptionally light, strong and stiff structural member. As mentioned, the reference to a triangulated rocker link is presented solely as an example of a type of part that may be made using the principles of the present invention. Many specific designs and configurations of structural parts are possible.

Therefore, specific details of the invention as disclosed herein are not to be interpreted as limiting the scope of the invention, but merely provide a basis for the claims and for teaching one skilled in the art to variously practice and construct the present invention in any appropriate manner. Changes may be made in the details of the construction of the particular component or member disclosed herein, and in individual steps of the method of fabricating the part, without departing from the spirit of the invention, especially as defined in the following claims.

We claim:

1. A composite fiber member comprising:
   at least one layer of carbon epoxy fiber bundles randomly oriented, said layer having an edge defining an outer perimeter of the layer;
   at least one unidirectional carbon fiber rope extending along the edge around the entire outer perimeter of the layer; and
   said bundles and said rope being bonded together.

2. The composite fiber member of claim 1, further comprising:
   at least two layers of randomly oriented carbon epoxy fiber bundles; and
   said layers being bonded together.

3. The composite fiber member of claim 2, further comprising:
   at least two unidirectional carbon fiber ropes extending around the perimeter of the layers.

4. The carbon fiber member of claim 1, wherein said member has a three-dimensional shape extending in an x direction, a y direction, and a z direction.

5. The composite fiber member of claim 4, said member having a first side and a second side, said first side having a face that extends in an x direction, a y direction, and a z direction.

6. The composite fiber member of claim 5, wherein said second side of said member extends in an x direction, a y direction, and a z direction.

7. The composite fiber member of claim 1, wherein said layer of carbon fiber bundles has a hole forming an inner perimeter.

8. The composite fiber member of claim 7, further comprising a second unidirectional fiber rope extending around the inner perimeter.

9. The composite fiber member of claim 2, further comprising at least one center strip of carbon epoxy fiber bundles between the layers.

* * * * *